United States Patent
Nam et al.

(10) Patent No.: US 11,178,710 B2
(45) Date of Patent: Nov. 16, 2021

(54) COMMUNICATION NETWORK CONNECTION CONTROL METHOD, STORAGE MEDIUM, AND ELECTRONIC DEVICE THEREFOR

(71) Applicant: Samsung Electronics Co., Ltd, Suwon-si (KR)

(72) Inventors: Jung Nam, Yongin-si (KR); Jung-Eun Lee, Suwon-si (KR); Ji-Yoon Park, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 218 days.

(21) Appl. No.: 16/326,357

(22) PCT Filed: Aug. 18, 2017

(86) PCT No.: PCT/KR2017/009053
§ 371 (c)(1),
(2) Date: Feb. 18, 2019

(87) PCT Pub. No.: WO2018/034544
PCT Pub. Date: Feb. 22, 2018

(65) Prior Publication Data
US 2020/0314929 A1 Oct. 1, 2020

(30) Foreign Application Priority Data
Aug. 18, 2016 (KR) .......................... 10-2016-0104645

(51) Int. Cl.
*H04W 76/15* (2018.01)
*H04W 76/30* (2018.01)

(52) U.S. Cl.
CPC .......... *H04W 76/15* (2018.02); *H04W 76/30* (2018.02)

(58) Field of Classification Search
None
See application file for complete search history.

(56) References Cited

U.S. PATENT DOCUMENTS 8,037,188 B2    10/2011  Li et al.
8,818,460 B2     8/2014  Kim et al.
(Continued)

FOREIGN PATENT DOCUMENTS

KR    10-2006-0022962 A    3/2006
KR    10-2006-0024884 A    3/2006
(Continued)

OTHER PUBLICATIONS

International Search Report dated Nov. 2, 2017 in connection with International Patent Application No. PCT/KR2017/009053, 3 pages.

*Primary Examiner* — Kodzovi Acolatse
*Assistant Examiner* — The Hy Nguyen

(57) ABSTRACT

According to various embodiments, an electronic device comprises; a display; a first communication module for communicating through a first communication network; a second communication module for communicating through a second communication network; a memory; and a processor electrically connected with the memory, wherein the memory can store, during execution, instructions for enabling the second communication module to be inactivated while the processor executes a designated application by using the first communication module in a state in which both the first communication module and the second communication module having a priority higher than that of the first communication module are activated.

14 Claims, 11 Drawing Sheets

(56) References Cited

U.S. PATENT DOCUMENTS

| | | | |
|---|---|---|---|
| 9,723,639 B2 | 8/2017 | Ren et al. | |
| 9,820,200 B2 | 11/2017 | Potra et al. | |
| 10,241,641 B1* | 3/2019 | Thantharate | H04W 36/14 |
| 2008/0247344 A1 | 10/2008 | Bahl et al. | |
| 2010/0075665 A1 | 3/2010 | Nader et al. | |
| 2013/0157722 A1* | 6/2013 | Kim | H04M 1/72448 |
| | | | 455/566 |
| 2013/0225282 A1* | 8/2013 | Williams | G07F 17/3241 |
| | | | 463/29 |
| 2014/0200685 A1 | 7/2014 | Ngai et al. | |
| 2016/0127898 A1* | 5/2016 | Gupta | G06F 21/43 |
| | | | 726/7 |
| 2017/0245190 A1* | 8/2017 | Katar | H04W 36/36 |

FOREIGN PATENT DOCUMENTS

| | | |
|---|---|---|
| KR | 10-1007610 B1 | 1/2011 |
| KR | 10-2013-0070792 A | 6/2013 |
| KR | 10-2014-0109444 A | 9/2014 |
| KR | 10-2014-0136309 A | 11/2014 |
| KR | 10-2016-0062735 A | 6/2016 |

\* cited by examiner

COMMUNICATION NETWORK CONNECTION CONTROL METHOD, STORAGE MEDIUM, AND ELECTRONIC DEVICE THEREFOR

CROSS-REFERENCE TO RELATED APPLICATIONS

This application is a 371 of International Application No. PCT/KR2017/009053 filed on Aug. 18, 2017, which claims priority to Korean Patent Application No. 10-2016-0104645 filed on Aug. 18, 2016, the disclosures of which are herein incorporated by reference in their entirety.

BACKGROUND

1. Field

The present disclosure generally relates to a method of controlling a communication network connection by an electronic device, a storage medium, and an electronic device for the same.

2. Description of the Related Art

Companies that provide mobile communication services provide a Wi-Fi network in public places free of charge in order to mitigate an increase of a load on a 3G data network, which has significantly increased due to the proliferation of smart phones, and in order to provide users with a data network providing service at a higher rate than that provided by 3G. The Wi-Fi network does not generally incur a separate communication fee, or incurs a lower fee than existing cellular networks according to a policy, and thus many users use a Wi-Fi network in places where a Wi-Fi network is provided.

Electronic devices such as smart phones can access various communication networks through a wireless communication unit, and users can select one of the accessible communication networks to perform data communication. Methods by which an electronic device capable of performing Wi-Fi access searches for an Access Point (AP) to receive wireless data service through AP access using Wi-Fi broadly include two methods. The two methods include a method by which a user directly activates a Wi-Fi function of an electronic device and searches for and connects to an accessible AP, and a method by which a user periodically turns on a Wi-Fi function on an electronic device if the Wi-Fi function is in a turned-on state through a separate settings window and automatically searches for an AP in order to reduce the user inconvenience of directly activating the Wi-Fi function each time.

SUMMARY

In general, when an electronic device enters a Wi-Fi network while performing a required task by executing various applications installed on the electronic device in a mobile communication network such as a 3G or 4G network, the electronic device automatically searches for all adjacent APs that have a Wi-Fi function in an active state. Further, when there is an AP that has been previously accessed at least once, the Wi-Fi connection is automatically made to the corresponding AP.

However, in the case in which an application is required to exchange data in real time with a server, execution of the application may be stopped or should be restarted due to the communication networks switching, which inconveniences the user. Only when a stable mobility support function is provided while using the application may the user enjoy a continuous and practical mobile environment. Accordingly, it is required for an application that needs to transmit and receive data in real time to provide a seamless data service.

An aspect of various embodiments of the present disclosure is to provide a method of controlling a communication network connection optimized for executing an application, and an electronic device for the same.

Another aspect of various embodiments of the present disclosure is to provide a method of limiting Wi-Fi network access according to an application type and an electronic device for the same.

In accordance with an aspect of the present disclosure, an electronic device is provided. The electronic device includes: a display; a first communication module configured to perform communication through a first communication network; a second communication module configured to perform communication through a second communication network; a memory; and a processor electrically connected to the memory, wherein the memory stores instructions causing the processor to, when executed, deactivate the second communication module while a predetermined application is executed using the first communication module, in a state in which both the first communication module and the second communication module, having a higher priority than the first communication module, are activated.

In accordance with another aspect of the present disclosure, a method of controlling a communication network connection by an electronic device is provided. The method includes: executing a predetermined application using a first communication module in a state in which both the first communication module for performing communication through a first communication network and a second communication module having a higher priority than the first communication module are activated; and performing a control to deactivate the second communication module while the predetermined application is executed.

In accordance with another aspect of the present disclosure, a storage medium storing instructions is provided. The instructions may be configured to cause at least one processor to, when executed by the at least one processor, perform at least one operation. The at least one operation includes an operation of executing a predetermined application using a first communication module in a state in which both the first communication module for performing communication through a first communication network and a second communication module having a higher priority than the first communication module are activated; and an operation of performing a control to deactivate the second communication module while the predetermined application is executed.

According to various embodiments of the present disclosure, even though an electronic device executes an application for exchanging data in real time in a mobile communication network such as 3G, 4G, or LTE and then enters an accessible Wi-Fi network, the electronic device may not access the Wi-Fi network, thereby acquiring an effect of preventing the execution of the application from stopping or being delayed. Accordingly, the user can continuously use the application anywhere, and as a result, user convenience can be improved.

DETAILED DESCRIPTION

Figure 1:
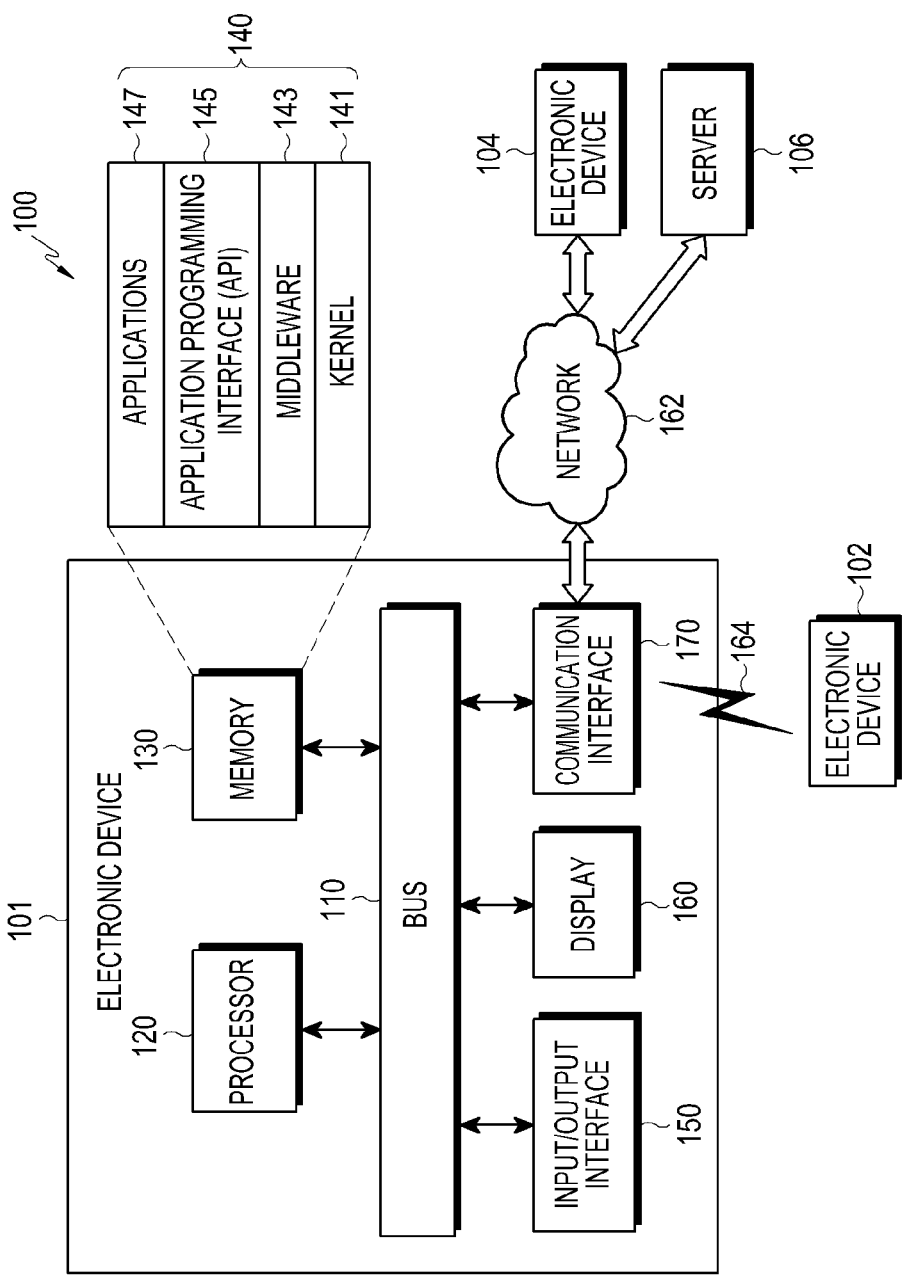
FIG. 1 illustrates a network environment including an electronic device according to various embodiments of the present disclosure.

Hereinafter, various embodiments of the present disclosure will be described with reference to the accompanying drawings. The embodiments and the terms used therein are not intended to limit the technology disclosed herein to specific forms, and should be understood to include various modifications, equivalents, and/or alternatives to the corresponding embodiments. In describing the drawings, similar reference numerals may be used to designate similar constituent elements. A singular expression may include a plural expression unless they are definitely different in a context. In the present disclosure, the expression "A or B", "at least one of A and/or B", or "A/B" may include all possible combinations of the items listed. The expression "a first", "a second", "the first", or "the second" used in various embodiments of the present disclosure may modify various components regardless of the order and/or the importance but does not limit the corresponding components. When an element (e.g., first element) is referred to as being "(functionally or communicatively) connected," or "directly coupled" to another element (second element), the element may be connected directly to the another element or connected to the another element through yet another element (e.g., third element).

The expression "configured to" as used in various embodiments of the present disclosure may be interchangeably used with, for example, "suitable for", "having the capacity to", "designed to", "adapted to", "made to", or "capable of" in terms of hardware or software, according to circumstances. Alternatively, in some situations, the expression "device configured to" may mean that the device, together with other devices or components, "is able to". For example, the phrase "processor adapted (or configured) to perform A, B, and C" may mean a dedicated processor (e.g., embedded processor) only for performing the corresponding operations or a generic-purpose processor (e.g., Central Processing Unit (CPU) or Application Processor (AP)) that can perform the corresponding operations by executing one or more software programs stored in a memory device.

An electronic device according to various embodiments of the present disclosure may include at least one of, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), a MPEG-1 audio layer-3 (MP3) player, a mobile medical device, a camera, and a wearable device. According to various embodiments, the wearable device may include at least one of an accessory type (e.g., a watch, a ring, a bracelet, an anklet, a necklace, a glasses, a contact lens, or a Head-Mounted Device (HMD)), a fabric or clothing integrated type (e.g., an electronic clothing), a body-mounted type (e.g., a skin pad, or tattoo), and a bio-implantable type (e.g., an implantable circuit). In some embodiments, the electronic device may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

In other embodiments, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic devices for a ship (e.g., a navigation device for a ship, and a gyro-compass), avionics, security devices, an automotive head unit, a robot for home or industry, an Automatic Teller's Machine (ATM) in banks, Point Of Sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.). According to some embodiments, an electronic device may include at least one of a part of furniture or a building/structure, an electronic board, an electronic signature receiving device, a projector, and various types of measuring instruments (e.g., a water meter, an electric meter, a gas meter, a radio wave meter, and the like). In various embodiments, the electronic device may be flexible, or may be a combination of one or more of the aforementioned various devices. The electronic device according to one embodiment of the present disclosure is not limited to the above described devices. In the present disclosure, the term "user" may indicate a person using an electronic device or a device (e.g., an artificial intelligence electronic device) using an electronic device.

An electronic device 101 in a network environment 100 according to various embodiments will be described with reference to FIG. 1. The electronic device 101 may include a bus 110, a processor 120, a memory 130, an input/output interface 150, a display 160, and a communication interface 170. In some embodiments, the electronic device 101 may omit at least one of the elements, or may further include other elements.

The bus 110 may include, for example, a circuit that interconnects the elements 110 to 170 and transmits communication (for example, control messages or data) between the elements.

The processor 120 may include one or more of a central processing unit, an application processor, and a communication processor (CP). The processor 120 may carry out, for example, operations or data processing relating to control and/or communication of at least one other element of the electronic device 101.

The memory 130 may include volatile and/or non-volatile memory. The memory 130 may store, for example, instructions or data relevant to at least one other element of the electronic device 101.

According to an embodiment, the memory 130 may store software and/or a program 140. The program 140 may include, for example, a kernel 141, middleware 143, an Application Programming Interface (API) 145, and/or applications (or "apps") 147. At least some of the kernel 141, the middleware 143, and the API 145 may be referred to as an operating system.

According to an embodiment, the memory 130 may be electrically connected to the processor 120 and may store instructions to cause the processor 120 to, when executed, deactivate a second communication module while a predetermined application is executed through a first communication module in a state in which the first communication module and the second communication module, having a higher priority than the first communication module, are both activated.

According to an embodiment, the memory 130 may store a plurality of applications and store mapping information for setting whether to limit communication network switching for each of the plurality of applications in response to user input. Further, the memory 130 may store information for setting whether to limit communication network switching commonly applied to all of the plurality of applications in response to user input.

The kernel 141 may control or manage system resources (for example, the bus 110, the processor 120, or the memory 130) used for executing an operation or function implemented by other programs (for example, the middleware 143, the API 145, or the application 147). Furthermore, the kernel 141 may provide an interface via which the middleware 143, the API 145, or the applications 147 may access the individual elements of the electronic device 101 to control or manage system resources.

The middleware 143 may function as, for example, an intermediary for allowing the API 145 or the applications 147 to communicate with the kernel 141 to exchange data. Furthermore, the middleware 143 may process one or more task requests, which are received from the applications 147, according to priorities thereof. For example, the middleware 143 may assign priorities for using system resources (for example, the bus 110, the processor 120, the memory 130, or the like) of the electronic device 101 to one or more of the applications 147, and may process the one or more task requests. The API 145 is an interface through which the applications 147 control functions provided from the kernel 141 or the middleware 143, and may include, for example, at least one interface or function (for example, instruction) for file control, window control, image processing, or text control. For example, the input/output interface 150 may forward instructions or data, input from a user or an external device, to the other element(s) of the electronic device 101, or may output instructions or data, received from the other element(s) of the electronic device 101, to the user or the external device.

The display 160 may include, for example, a Liquid Crystal Display (LCD), a Light-Emitting Diode (LED) display, an Organic Light-Emitting Diode (OLED) display, a Micro Electro Mechanical System (MEMS) display, or an electronic paper display. The display 160 may display, for example, various types of content (for example, text, images, videos, icons, and/or symbols) for a user. The display 160 may include a touch screen and may receive, for example, touch, gesture, proximity, or hovering input using an electronic pen or the user's body part.

The communication interface 170 may establish, for example, communication between the electronic device 101 and an external device (for example, a first external electronic device 102, a second external electronic device 104, or a server 106). For example, the communication interface 170 may be connected to a network 162 through wireless or wired communication to communicate with the external device (for example, the second external electronic device 104 or the server 106).

The wireless communication may include, for example, cellular communication that uses at least one of LTE, LTE-Advance (LTE-A), code-division multiple access (CDMA), wideband CDMA (WCDMA), universal mobile telecommunications system (UMTS), wireless broadband (WiBro), global system for mobile communications (GSM), or the like. According to an embodiment, the wireless communication may include, for example, at least one of Wi-Fi (Wireless Fidelity), Bluetooth, Bluetooth Low Energy (BLE), ZigBee, near field communication (NFC), magnetic secure transmission, Radio Frequency (RF), and body area network (BAN). According to an embodiment, the wireless communication may include a GNSS. The GNSS may be, for example, a global positioning system (GPS), a global navigation satellite system (GLONASS), a BeiDou navigation satellite system (hereinafter, referred to as "BeiDou"), or Galileo (the European global satellite-based navigation system). Hereinafter, in this document, the term "GPS" may be interchangeable with the term "GNSS". The wired communication may include, for example, at least one of a Universal Serial Bus (USB), a High-Definition Multimedia Interface (HDMI), Recommended Standard 232 (RS-232), power-line communication, a Plain Old Telephone Service (POTS), and the like. The network 162 may include a telecommunications network, for example, at least one of a computer network (for example, a LAN or a WAN), the Internet, and a telephone network.

Each of the first and second external electronic devices 102 and 104 may be of a type identical to or different from that of the electronic device 101.

According to various embodiments, all or some of the operations performed in the electronic device 101 may be performed in another electronic device or a plurality of electronic devices (for example, the electronic devices 102 and 104 or the server 106).

According to an embodiment, when the electronic device 101 has to perform a function or service automatically or in response to a request, the electronic device 101 may request another device (for example, the electronic device 102 or 104, or the server 106) to perform at least some functions relating thereto, instead of autonomously or additionally performing the function or service. Another electronic device (for example, the electronic device 102 or 104, or the server 106) may execute the requested functions or the additional functions, and may deliver information about the result of execution thereof to the electronic device 101. The electronic device 101 may provide the received result as it is, or may additionally process the received result to provide the requested functions or services. To this end, for example, cloud-computing, distributed-computing, or client-server-computing technology may be used.

According to various embodiments of the present disclosure, the processor 120 may perform control to deactivate the second communication module while a predetermined application is executed using the first communication module in a state in which the first communication module and the second communication module, having a higher priority than the first communication module, are both activated. The first communication module may perform communication through the first communication network, and the first communication network may be a mobile communication network which is one of 2nd Generation (G), 3G, 4G, and Long-Term Evolution (LTE). The second communication module may perform communication through the second communication network, and the second communication network may be a Wi-Fi network.

According to an embodiment, when the execution of the predetermined application ends, the processor 120 may perform control to activate the second communication module.

According to an embodiment, the predetermined application is an application required to transmit or receive data in real time to or from an external server and may include at least one of a real-time video provision application and a game application. Accordingly, if it is determined that the application executed when the predetermined application is executed is a game application of which communication network switching is limited, the processor 120 may deactivate the second communication network function.

According to an embodiment, when the predetermined application is executed while accessing the first communication network, the processor 120 may identify attribute information of the executed predetermined application and then deactivate the second communication network function based on the identified attribute information. The attribute information of the application may include at least one of application identification information, an application type, and information on the amount of used data.

According to an embodiment, the processor 120 may store mapping information for setting whether to limit communication network switching for each of the plurality of applications in the memory 130 in response to user input.

According to an embodiment, the processor 120 may determine whether the predetermined application is an application for which communication network switching is limited on the basis of the mapping information stored in the memory 130. When the application corresponds to an application for which the communication network switching is limited, the processor 120 may perform control to deactivate the second communication module while the predetermined application is executed using the first communication module.

According to an embodiment, the processor 120 may perform control to display information indicating the limit of the second communication network connection through the second communication network on the display 160 when the predetermined application is executed using the first communication module. Further, when the execution of the predetermined application ends, the processor 120 may perform control to display information indicating release of the limit of the second communication network connection on the display 160.

Accordingly, although the electronic device 101 enters an area in which the Wi-Fi function can be used as the electronic device 101 is changed such that the Wi-Fi function is turned on, the processor 120 may not perform an operation for searching for an accessible AP in the state in which the predetermined application is being executed. Thereafter, when the application ends, the processor 120 may activate the Wi-Fi function again.

As described, the processor 120 may continuously provide an application service to a user by making the execution of the application not end due to a change in the communication network while the application is executed in the state in which access to the mobile communication network is maintained.

Meanwhile, although a game is described as an example of the application of which Wi-Fi network access is limited during the execution of the application, any application for transmitting or receiving data to or from a server in real time, such as a real-time video provision application, can be another example thereof.

Figure 2:
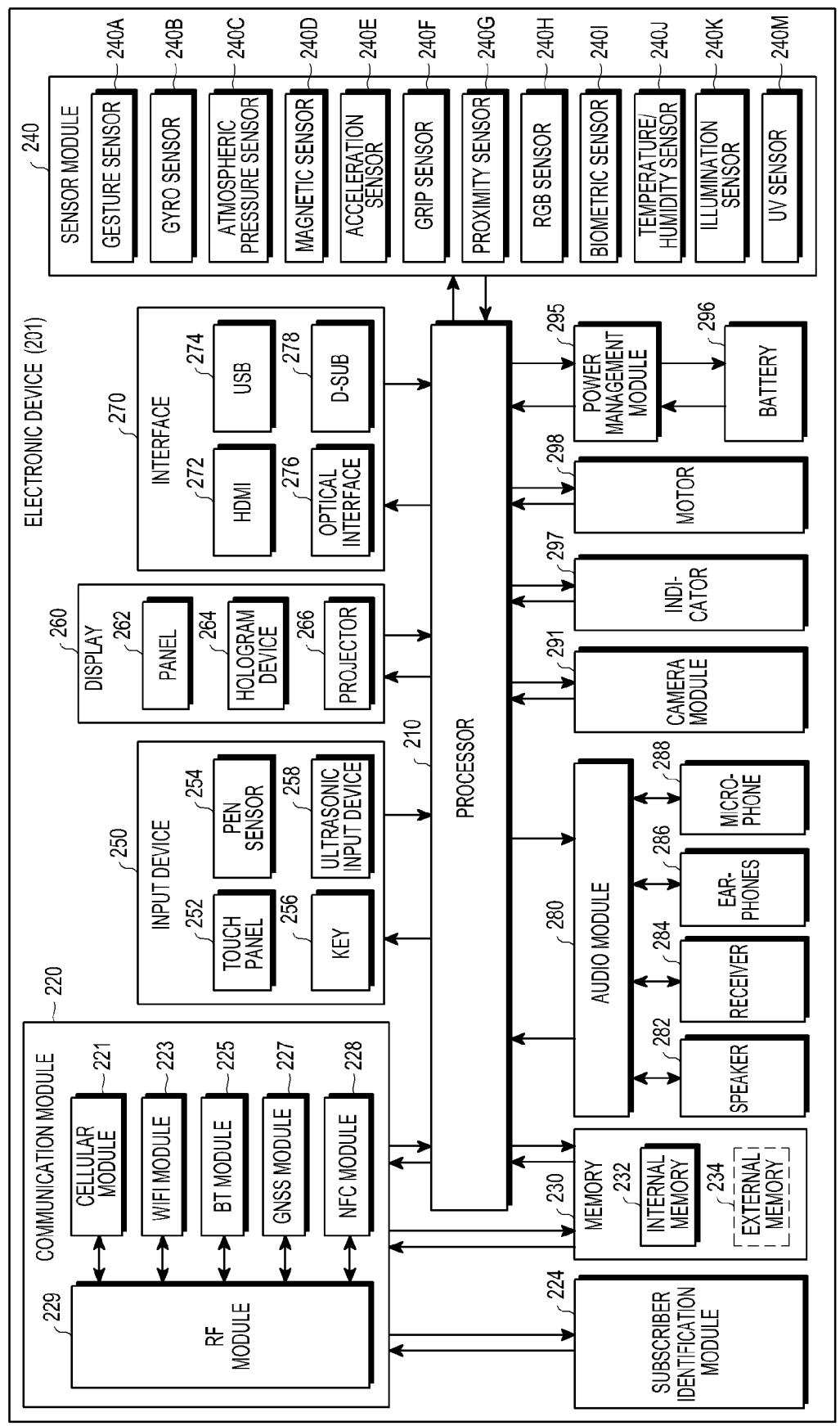
FIG. 2 is a block diagram of an electronic device according to various embodiments of the present disclosure.

FIG. 2 is a block diagram illustrating an electronic device 201 according to various embodiments. The electronic device 201 may include, for example, all or part of the electronic device 101 illustrated in FIG. 1. The electronic device 201 may include at least one processor 210 (for example, an AP), a communication module 220, a subscriber identification module 224, a memory 230, a sensor module 240, an input device 250, a display 260, an interface 270, an audio module 280, a camera module 291, a power management module 295, a battery 296, an indicator 297, and a motor 298. The processor 210 may control a plurality of hardware or software elements connected thereto, and may perform various data processing and operations by driving an operating system or an application. The processor 210 may be embodied, for example, as a System on Chip (SoC).

According to an embodiment, the processor 210 may further include a graphic processing unit (GPU) and/or an image signal processor. The processor 210 may also include at least some of the elements illustrated in FIG. 2 (for example, a cellular module 221). The processor 210 may load, in volatile memory, instructions or data received from at least one of the other elements (for example, non-volatile memory), process the loaded instructions or data, and store the resultant data in the non-volatile memory.

The communication module 220 may have a configuration that is the same as, or similar to, that of the communication interface 170. The communication module 220 may include, for example, a cellular module 221, a Wi-Fi module 223, a Bluetooth module 225, a GNSS module 227, an NFC module 228, and an RF module 229. The cellular module 221 may provide, for example, a voice call, a video call, a text-message service, an Internet service, or the like via a communication network.

According to an embodiment of the present disclosure, the cellular module 221 may identify or authenticate an electronic device 201 in the communication network using a subscriber identification module (for example, a Subscriber Identity Module (SIM) card) 224. According to an embodiment, the cellular module 221 may perform at least some of the functions that the processor 210 may provide. According to an embodiment, the cellular module 221 may include a communication processor (CP). In some embodiments, at least some (two or more) of the cellular module 221, the Wi-Fi module 223, the Bluetooth module 225, the GNSS module 227, and the NFC module 228 may be included in a single Integrated Chip (IC) or IC package. The RF module 229 may transmit/receive, for example, a communication signal (for example, an RF signal). The RF module 229 may include, for example, a transceiver, a power amp module (PAM), a frequency filter, a low-noise amplifier (LNA), an antenna, or the like. According to another embodiment, at least one of the cellular module 221, the Wi-Fi module 223, the Bluetooth module 225, the GNSS module 227, and the NFC module 228 may transmit/receive an RF signal via a separate RF module. The subscriber identification module 224 may include, for example, a card that includes a subscriber identity module and/or an embedded SIM, and may contain unique identification information (for example, an Integrated Circuit Card Identifier (ICCID)) or subscriber information (for example, an International Mobile Subscriber Identity (IMSI)).

The memory 230 (for example, the memory 130) may include, for example, internal memory 232 or external memory 234. The internal memory 232 may include, for example, at least one of volatile memory (for example, DRAM, SRAM, SDRAM, or the like) and non-volatile memory (for example, One-Time Programmable ROM (OTPROM), PROM, EPROM, EEPROM, mask ROM, flash ROM, flash memory, a hard disk drive, or a Solid-State Drive (SSD)). The external memory 234 may include a flash drive, for example, compact flash (CF), secure digital (SD), Micro-SD, Mini-SD, eXtreme digital (xD), a multimedia card (MMC), a memory stick, and the like. The external memory 234 may be functionally and/or physically connected to the electronic device 201 through any of various interfaces.

The sensor module 240 may, for example, measure a physical quantity or detect the state of operation of the electronic device 201, and may convert the measured or detected information into an electrical signal. The sensor module 240 may include, for example, at least one of a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (for example, a red, green, blue (RGB) sensor), a biometric sensor 240I, a temperature/humidity sensor 240J, an illumination sensor 240K, and an ultraviolet (UV) sensor 240M. Additionally or alternatively, the sensor module 240 may include, for example, an e-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 240 may further include a control circuit for controlling one or more sensors included therein. In some embodiments, the electronic device 201 may further include a processor, which is configured to control the sensor module 240, as part of the processor 210 or separately from the processor 210, in order to control the sensor module 240 while the processor 210 is in a sleep state.

The input device 250 may include, for example, a touch panel 252, a (digital) pen sensor 254, a key 256, or an ultrasonic input device 258. The touch panel 252 may use, for example, at least one of a capacitive type, a resistive type, an infrared type, and an ultrasonic type. Furthermore, the touch panel 252 may further include a control circuit. The touch panel 252 may further include a tactile layer to provide a tactile reaction to a user. The (digital) pen sensor 254 may include, for example, a recognition sheet that is a part of, or separate from, the touch panel. The key 256 may include, for example, a physical button, an optical key, or a keypad. The ultrasonic input device 258 may detect ultrasonic waves, which are generated by an input tool, through a microphone (for example, a microphone 288) to identify data corresponding to the detected ultrasonic waves.

The display 260 (for example, the display 160) may include a panel 262, a hologram device 264, a projector 266, and/or a control circuit for controlling them. The panel 262 may be implemented to be, for example, flexible, transparent, or wearable. The panel 262, together with the touch panel 252, may be configured as one or more modules. According to an embodiment, the panel 262 may include a pressure sensor (or a POS sensor) which may measure the strength of pressure of a user's touch. The pressure sensor may be implemented so as to be integrated with the touch panel 252 or may be implemented as one or more sensors separate from the touch panel 252. The hologram device 264 may show a three-dimensional image in the air using light interference. The projector 266 may display an image by projecting light onto a screen. The screen may be located, for example, in the interior of, or on the exterior of, the electronic device 201. The interface 270 may include, for example, an HDMI 272, a USB 274, an optical interface 276, or a D-subminiature (D-sub) interface 278. The interface 270 may be included in, for example, the communication interface 170 illustrated in FIG. 1. Additionally or alternatively, the interface 270 may, for example, include a Mobile High-definition Link (MHL) interface, a Secure Digital (SD) card/MultiMedia Card (MMC) interface, or an Infrared Data Association (IrDA) standard interface.

The audio module 280 may convert, for example, sound into an electrical signal, and vice versa. At least some elements of the audio module 280 may be included, for example, in the input/output interface 145 illustrated in FIG. 1. The audio module 280 may process sound information that is input or output via, for example, a speaker 282, a receiver 284, earphones 286, the microphone 288, and the like.

The camera module 291 is a device that can photograph a still image and a moving image. According to an embodiment, the camera module 291 may include one or more image sensors (for example, a front sensor or a rear sensor), a lens, an image signal processor (ISP), or a flash (for example, an LED or xenon lamp).

The power management module 295 may manage, for example, the power of the electronic device 201. According to an embodiment, the power management module 295 may include a power management integrated circuit (PMIC), a charger IC, or a battery or fuel gauge. The PMIC may use a wired and/or wireless charging method. The wireless charging method may include, for example, a magnetic-resonance method, a magnetic-induction method, an electromagnetic-wave method, and the like. Additional circuits, for example, a coil loop, a resonance circuit, a rectifier, and the like for wireless charging may be further included. The battery gauge may measure, for example, the amount of charge remaining in the battery 296 and a voltage, current, or temperature while charging. The battery 296 may include, for example, a rechargeable battery and/or a solar battery.

The indicator 297 may display a particular state, for example, a booting state, a message state, a charging state, or the like of the electronic device 201 or a part (for example, the processor 210) of the electronic device 201. The motor 298 may convert an electrical signal into a mechanical vibration and may generate a vibration, a haptic effect, or the like. The electronic device 201 may include a mobile TV support device that can process media data according to a standard such as Digital Multimedia Broadcasting (DMB), Digital Video Broadcasting (DVB), mediaFlo™, and the like. Each of the above-described component elements of hardware according to the present disclosure may be configured with one or more components, and the names of the corresponding component elements may vary based on the type of electronic device. According to various embodiments, the electronic device (for example, the electronic device 201) may not include some elements, or may further include additional elements. Some elements may be coupled to constitute one object, but the electronic device may perform the same functions as those of the corresponding elements before being coupled to each other.

Figure 3:
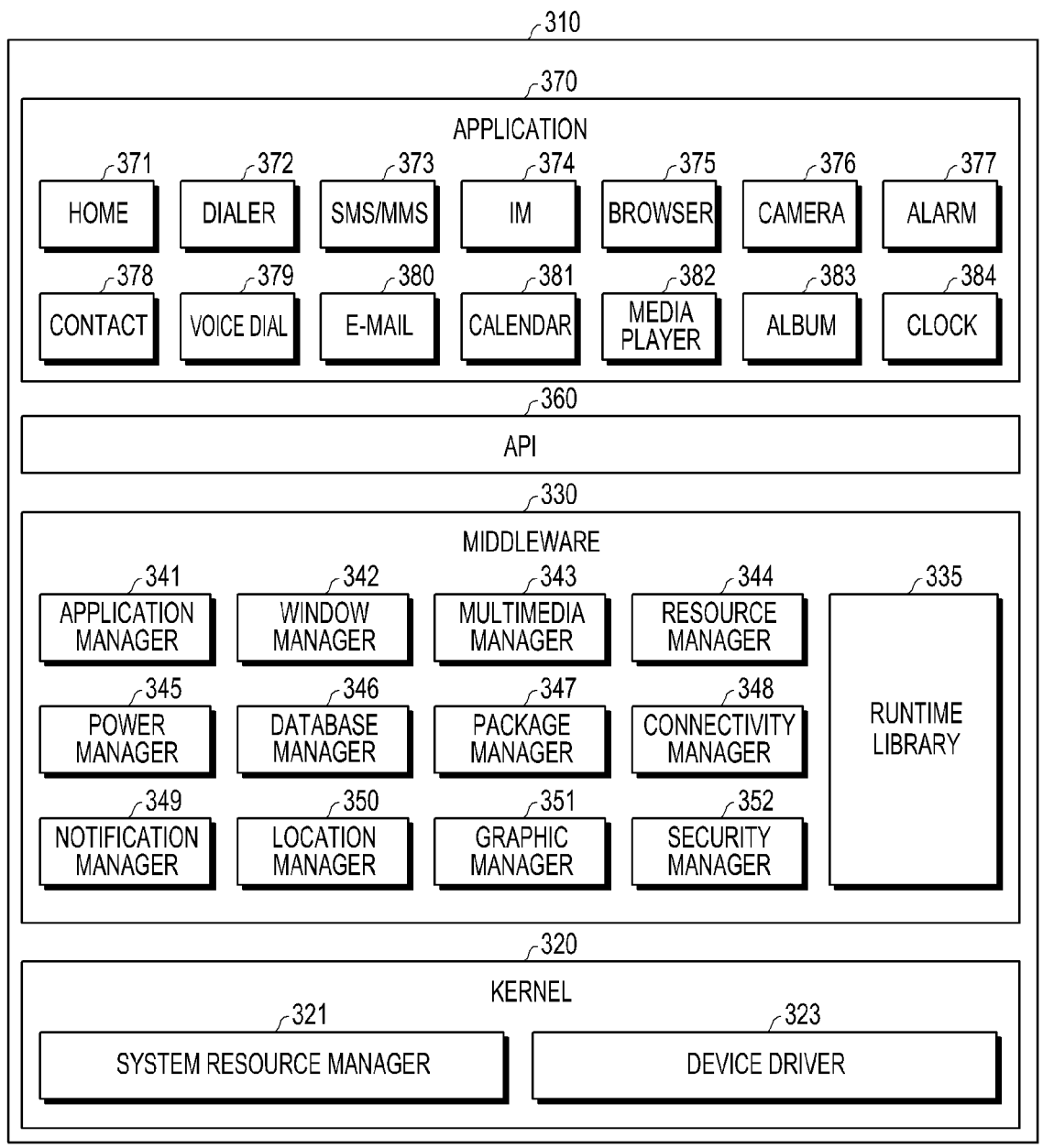
FIG. 3 is a block diagram of a program module according to various embodiments of the present disclosure.

FIG. 3 is a block diagram of a program module according to various embodiments. According to an embodiment, the program module 310 (for example, the program 140) may include an Operating System (OS) that controls resources relating to an electronic device (for example, the electronic device 101) and/or various applications (for example, the applications 147) that are driven on the operating system. The operating system may include, for example, Android™, iOS™, Windows™, Symbian™, Tizen™, or Bada™. Referring to FIG. 3, the program module 310 may include a kernel 320 (for example, the kernel 141), middleware 330 (for example, the middleware 143), an API 360 (for example, the API 145), and/or applications 370 (for example, the applications 147). At least a part of the program module 310 may be preloaded on the electronic device, or may be downloaded from an external electronic device (for example, the electronic device 102 or 104 or the server 106).

The kernel 320 may include, for example, a system resource manager 321 and/or a device driver 323. The system resource manager 321 may control, allocate, or retrieve system resources. According to an embodiment, the system resource manager 321 may include a process manager, a memory manager, or a file system manager. The device driver 323 may include, for example, a display driver, a camera driver, a Bluetooth driver, a shared memory driver, a USB driver, a keypad driver, a Wi-Fi driver, an audio driver, or an inter-process communication (IPC) driver.

The middleware 330 may provide, for example, a function required by the applications 370 in common, or may provide various functions to the applications 370 through the API 360 such that the applications 370 can efficiently use the limited system resources within the electronic device. According to an embodiment, the middleware 330 may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include, for example, a library module that a compiler uses in order to add a new function via a programming language while the applications 370 are being executed. The runtime library 335 may manage input/output, manage a memory, or process an arithmetic function. The application manager 341 may manage, for example, the life cycles of the applications 370. The window manager 342 may manage GUI resources used for a screen. The multimedia manager 343 may identify formats required for reproducing media files and may encode or decode a media file using a codec suitable for the corresponding format. The resource manager 344 may manage the source code of the applications 370 or the space in memory. The power manager 345 may manage, for example, the capacity or power of a battery and may provide power information required for operating the electronic device. According to an embodiment, the power manager 345 may operate in conjunction with a Basic Input/Output System (BIOS). The database manager 346 may, for example, generate, search, or change databases to be used by the applications 370. The package manager 347 may manage the installation or update of an application that is distributed in the form of a package file.

The connectivity manager 348 may manage, for example, a wireless connection. The notification manager 349 may provide information on an event (for example, an arrival message, an appointment, a proximity notification, or the like) to a user. The location manager 350 may manage, for example, the location information of the electronic device. The graphic manager 351 may manage a graphic effect to be provided to a user and a user interface relating to the graphic effect. The security manager 352 may provide, for example, system security or user authentication. According to an embodiment, the middleware 330 may include a telephony manager for managing a voice or video call function of the electronic device or a middleware module that is capable of forming a combination of the functions of the above-described elements. According to an embodiment, the middleware 330 may provide an operating-system-specific module. The middleware 330 may dynamically remove some of the existing elements, or may add new elements. The API 360 is, for example, a set of API programming functions, and may be provided with different configurations according to the operating system. For example, with respect to each platform, one API set may be provided in the case of Android or iOS, and two or more API sets may be provided in the case of Tizen.

According to an embodiment, the middleware 330 may further include a game service manager 353 for providing and managing a game service. The game service manager 353 may transmit or receive data to or from a corresponding external server (for example, a game server) and may receive content, such as a game provided from a content provider or a network provider through a network, and information related thereto. Further, when the game application is executed, the game service manager 353 may transmit or receive data related to the executed application. The game service manager 353 may be separately implemented as illustrated in FIG. 3 or may be included in the application manager 341.

The applications 370 may include, for example, a home application 371, a dialer application 372, an SMS/MMS application 373, an instant messaging (IM) application 374, a browser application 375, a camera application 376, an alarm application 377, a contact application 378, a voice dialer application 379, an email application 380, a calendar application 381, a media player application 382, an album application 383, a clock application 384, a health-care application (for example, for measuring exercise quantity or blood glucose), or an application providing environmental information (for example, atmospheric pressure, humidity, or temperature information). According to an embodiment, the applications 370 may include an information exchange application that can support the exchange of information between the electronic device and an external electronic device. The information exchange application may include, for example, a notification relay application for relaying particular information to an external electronic device or a device management application for managing an external electronic device. For example, the notification relay application may relay notification information generated in the other applications of the electronic device to an external electronic device, or may receive notification information from an external electronic device and provide the received notification information to a user. The device management application may perform a function (for example, a function of turning on/off an external electronic device (or some elements thereof) or controlling brightness (or resolution) of the display) of the external electronic device communicating with the electronic device or install, delete, or update an application executed by the external electronic device. According to an embodiment, the applications 370 may include applications (for example, a health care application of a mobile medical appliance) that are designated according to the attributes of an external electronic device. According to an embodiment, the applications 370 may include applications received from an external electronic device. At least some of the program module 310 may be implemented (for example, executed) by software, firmware, hardware (for example, the processor 210), or a combination of two or more thereof, and may include a module, a program, a routine, an instruction set, or a process for performing one or more functions.

Hereinafter, a method of, when both the mobile network function and the Wi-Fi function of the electronic device 101 are in the turned-on state and an application is executed while the electronic device 101 accesses a mobile communication network, preventing the interruption of the application due to a change of communication network will be described.

The user may select a fast setting button, for example, an icon that indicates the mobile network function located in an upper settings window of the display of the electronic device 101 and that has a toggle type, so as to activate or deactivate the first communication module of the electronic device 101. Similarly, the user may select an icon indicating the Wi-Fi function located in the settings window in the toggle type, so as to activate or deactivate the second communication module of the electronic device 101. The first communication module may be a module for performing communication through a mobile communication network, which is one of 2nd Generation (G), 3G, 4G, and Long-Term Evolution (LTE), and the second communication module may be a module for performing communication through a Wi-Fi network.

When the user has turned on the Wi-Fi function through the setting window, the electronic device 101 may activate the second communication module and periodically search whether there is an accessible AP through the second communication module. Accordingly, when the user sets the Wi-Fi function to be turned on while turning on the mobile network function, both the first communication module and the second communication module of the electronic device 101 operate in the active state and when there is an accessible AP in the vicinity, perform communication through the second communication module.

On the other hand, when there is no accessible AP in the vicinity, the electronic device 101 may perform communication through the first communication module. When the electronic device 101 moves and enters an area in which an accessible AP exists, the electronic device 101 may release the access through the first communication module and then access the Wi-Fi network through the second communication module and perform communication. As described above, when the electronic device 101 enters the Wi-Fi network area even while accessing the first communication network through the first communication module, the electronic device 101 automatically switches to the second communication network, that is, the Wi-Fi network, through the second communication module, such that the priority of the second communication module may be higher than the first communication module.

However, when an application execution request is input in the state in which the second communication module is activated or no accessible AP is found, the electronic device 101 may execute the application through the first communication module. Thereafter, when the electronic device 101 moves and enters the area in which an accessible AP exists and accesses the Wi-Fi network through the second communication module, the network address is changed, such that the application may have to be stopped or restarted.

When the executed application is an application (for example, a game application) required to transmit or receive data in real time to or from an external server, the game may be stopped or delayed at a time that the user did not intend due to the communication network switching. Accordingly, the communication network type for communication is important to the application required to transmit or receive data in real time to or from the external server.

To this end, hereinafter, a method by which the electronic device determines a communication network for communication and attributes of an application which should be considered, according to various embodiments of the present disclosure, will be discussed.

Figure 4A:
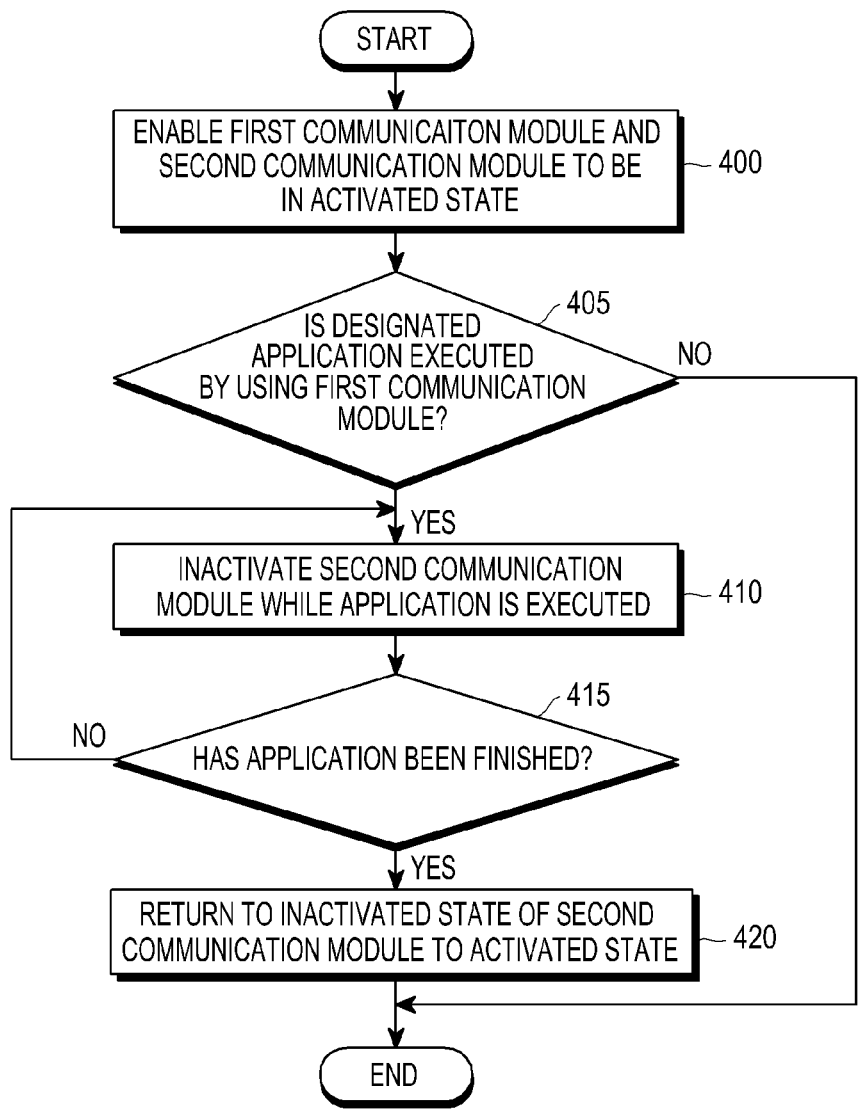
FIG. 4A is a flowchart illustrating a method of controlling a communication network connection by an electronic device according to various embodiments of the present disclosure.

FIG. 4A is a flowchart illustrating a method of controlling a communication network connection by an electronic device according to various embodiments of the present disclosure.

Referring to FIG. 4A, when the user sets the Wi-Fi function to be turned on while turning on the mobile network function, the processor 120 may operate in the state in which the first communication module and the second communication module are active in operation 400. In the state in which both the first communication module and the second communication module are active, the processor 120 may determine whether a predetermined application is executed using the first communication module in operation 405. The first communication module may be a module for performing communication through a mobile communication network, which is one of 2G, 3G, 4G, and LTE, and the second communication module may be a module for performing communication through the Wi-Fi network.

When a predetermined application (for example, a game application) is executed using the first communication module, the processor 120 may perform a control to deactivate the second communication module while the application is executed using the first communication module in operation 410. Specifically, when the electronic device 101 enters the Wi-Fi network area even though the processor 120 executes the predetermined application using the first communication module, the priority of the second communication module is higher than that of the first communication module in the state in which both the first communication module and the second communication module are activated, so that an operation for attempting access to the Wi-Fi network may be performed. In order to prevent the access attempt, the processor 120 may deactivate the second communication module.

According to various embodiments of the present disclosure, the processor 120 may disable the Wi-Fi function when the predetermined application is executed. Accordingly, even though the electronic device 101 enters the Wi-Fi network accessible area according to movement of the user, the Wi-Fi function itself is disabled, so that an operation for Wi-Fi access, such as an operation for periodically searching for an AP, may be blocked.

Thereafter, the processor 120 may determine whether the executed application ends in operation 415. For example, when an end request of the user, such as a touch input, for the application being executed is input, execution of the application may end. According to the end of the execution of the application, the processor 210 may return the inactive state of the second communication module to the active state in operation 420.

Figure 4B:
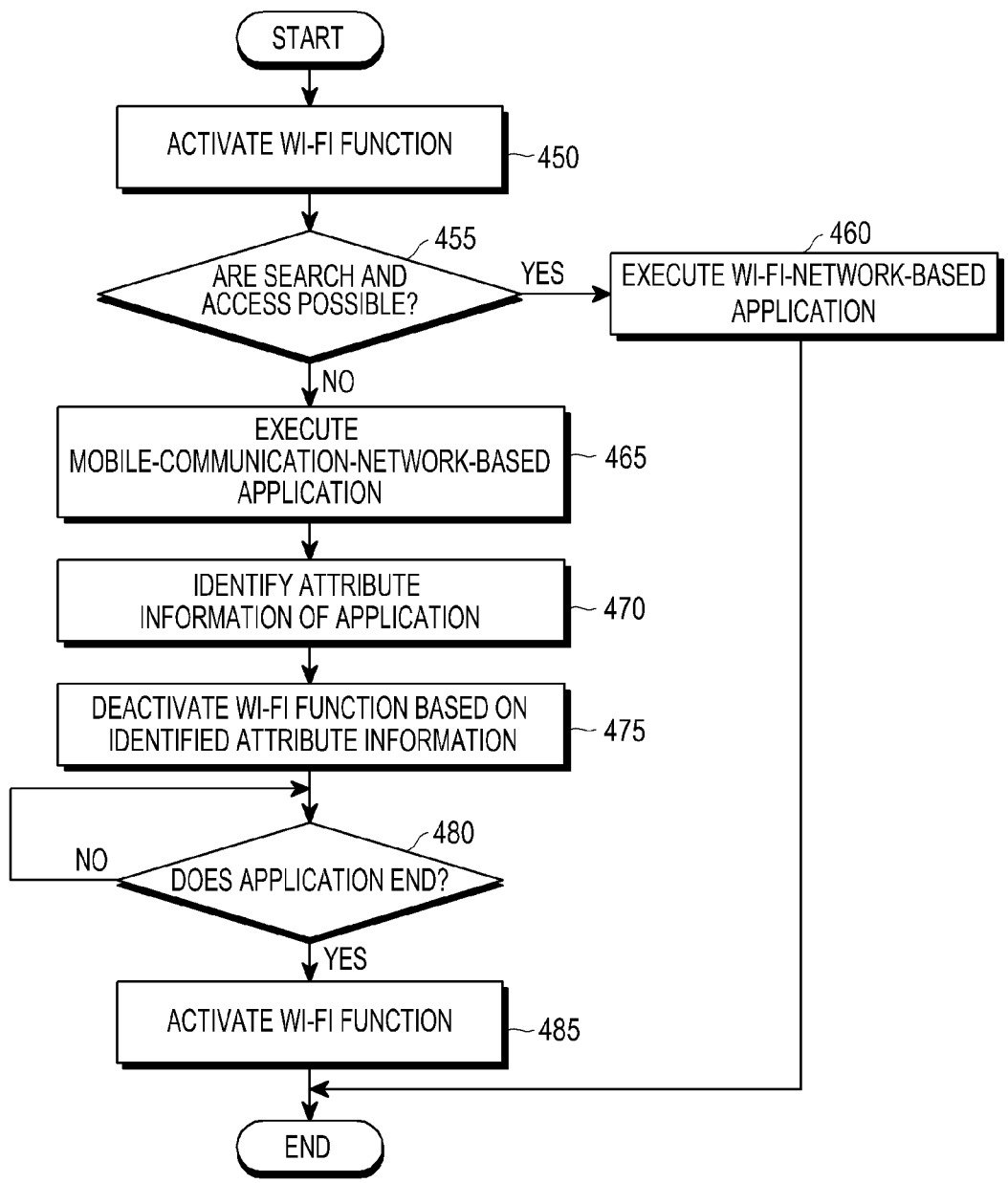
FIG. 4B is a flowchart illustrating a method of controlling a Wi-Fi network connection by an electronic device according to various embodiments of the present disclosure.

FIG. 4B is a flowchart illustrating a method of controlling a W-Fi network connection by an electronic device according to various embodiments of the present disclosure.

Referring to FIG. 4B, when the Wi-Fi function is in the active state in operation 450, the processor 120 may search for at least one accessible AP and determine whether accessing one of the found access points is possible in operation 455. When it is possible to search for and access the Wi-Fi connection, that is, when an accessible AP is found, the processor 120 may access the found AP according to a preset reference. The processor 120 may execute a Wi-Fi-network-based application in operation 460 on the basis of an application (for example, a game application) execution request corresponding to the user input. Since the operation of executing the Wi-Fi-network-based application corresponds to the operation of transmitting/receiving, through the Wi-Fi network, data related to the executed application through the connection to the Wi-Fi network, a detailed description thereof will be omitted.

On the other hand, when searching and accessing are not possible, the processor 120 may execute a mobile-communication-network-based application in operation 465. Subsequently, the processor 120 may identify attribute information of the executed application in operation 470. The attribute information of the application may be used for determining whether the application executed in the electronic device 101 is an application required to transmit and receive data in real time to and from the external server.

The attribute information of the application for determining whether the application is an application required to transmit and receive data in real time to and from the external server may include at least one piece of application identification information (ID), an application type, and information on the amount of used data. Further, the attribute information of the application may further include information indicating whether to automatically switch communication networks. In addition, any information that can be used for determining whether the application is an application that is required to transmit and receive data in real time to and from an external server may be used as the attribute information of the application.

According to an embodiment, the attribute information of the application may be attribute information that the processor 120 has stored according to each application in advance when downloading the applications, or may be attribute information received from the external server when the application is executed. As described above, on the basis of the pre-stored attribute information of the application or the attribute information provided from the external server, the processor 120 may determine whether the executed application is an application for which automatic switching of communication networks is should be deactivated.

Further, information indicating whether to accept automatic switching of communication networks for the predetermined application may be set differently for respective applications by an application manufacturing company and may be capable of being changed by the user. The automatic switching of communication networks may be a function of automatically switching communication networks according to the location of the electronic device 101 in the state in which both the first communication module and the second communication module are activated. For example, the company that manufactures a game application may determine attribute information such that automatic switching of communication networks is blocked for all game applications.

Accordingly, the processor 120 may deactivate the Wi-Fi function on the basis of the attribute information identified in operation 475. For example, when it is determined that the executed application is an application, such as a game application, required to transmit and receive data in real time to and from the external server on the basis of the identified attribute information, the processor 120 may deactivate the Wi-Fi function.

Thereafter, the processor 120 may determine whether the application ends in operation 480 and execute the application while maintaining the access state of the mobile communication network through which the application does not end. On the other hand, when the execution of the application ends in operation 480, that is, when an application end request is input by the user, the processor 120 may end the execution of the application and once again also activate the Wi-Fi function in operation 485.

Figure 4C:
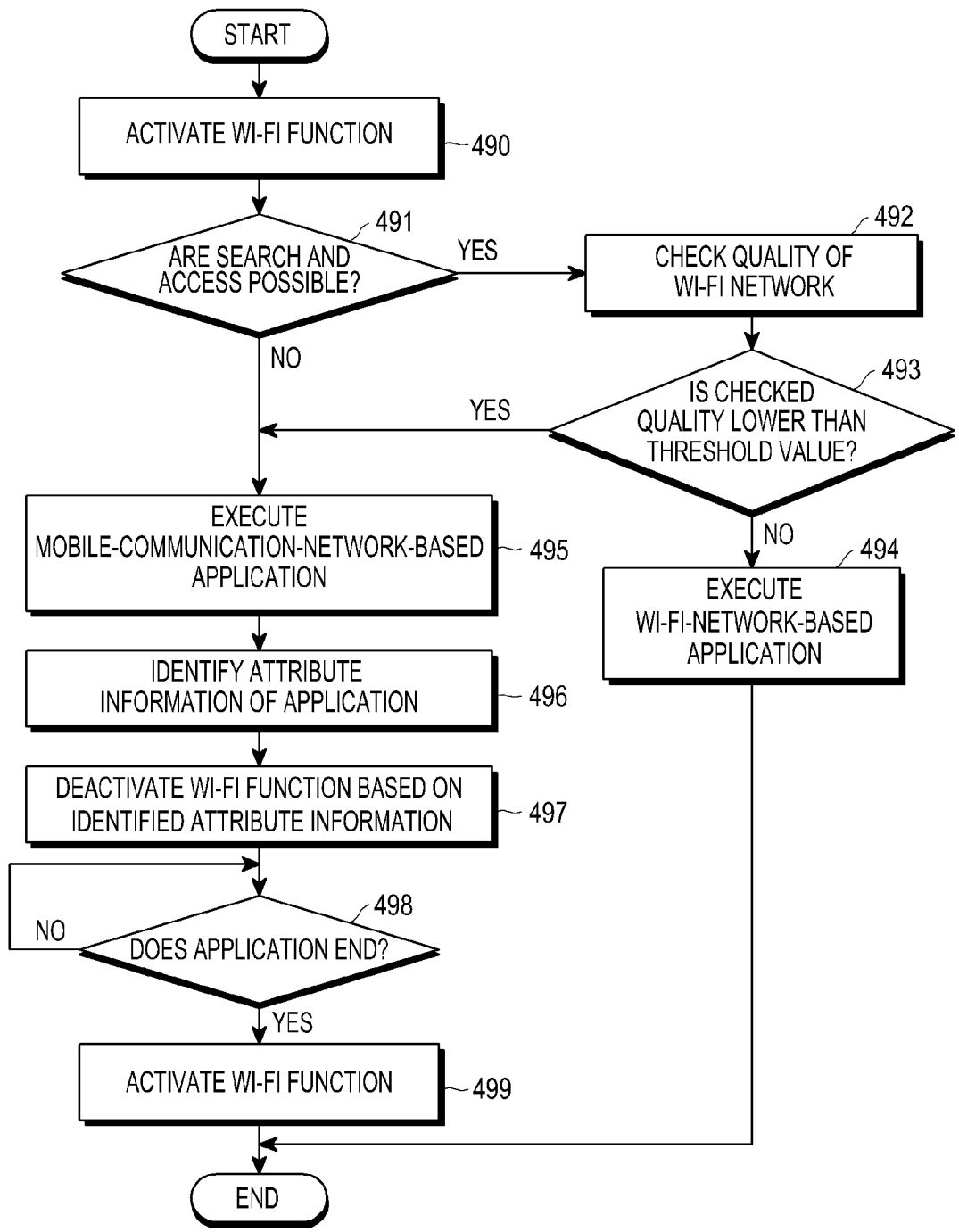
FIG. 4C is a flowchart illustrating a method of controlling a Wi-Fi network connection by an electronic device according to an embodiment of the present disclosure.

FIG. 4C is a flowchart illustrating a method of controlling a Wi-Fi network connection by an electronic device according to an embodiment of the present disclosure.

Since operations 490 and 491 of FIG. 4C are the same as operations 450 and 455 of FIG. 4B and operations 495 to 499 are the same as operations 465 to 485 of FIG. 4B, a detailed description thereof will be omitted.

However, when it is possible to search for and access the Wi-Fi connection, in operation 491 of FIG. 4C, when an accessible AP is found, the processor 120 may access the found AP according to a preset standard. Although the accessible AP is found, the processor 120 may check the signal quality from the AP in operation 492. According to various embodiments of the present disclosure, the processor 120 checks the Wi-Fi network quality before actually executing the Wi-Fi-network-based application in order to provide a seamless application execution screen. Accordingly, operation 492 may be performed before executing the application on the basis of an application (for example, a game application) execution request corresponding to a user input. Further, in FIG. 4C, the application execution request may be detected by the user before operation 491 or 492, which means that the time point at which the execution request is input is not limited.

Accordingly, the processor 120 may check the Wi-Fi network quality (for example, reception sensitivity of the Wi-Fi network, reliability, and bandwidth) in operation 492 and determine whether the checked quality is lower than a threshold value in operation 493. For example, the reception sensitivity of the Wi-Fi network may be lower than a threshold value set for the reception sensitivity due to movement speed while the user travels by subway, in which Wi-Fi communication is possible. Further, when the user is not in a reliable place in which the user frequently uses Wi-Fi communication (for example, at home or in an office), reliability of the Wi-Fi network may be lower than a threshold value set for reliability.

When the checked quality is lower than the threshold value, the processor 120 may perform a control to execute the mobile-communication-network-based application in operation 495. When the checked quality is not lower than the threshold value, the processor 120 may perform a control to execute the Wi-Fi-network-based application in operation 494.

According to an embodiment, when an application execution request is input, the processor 120 may determine whether the signal quality of the Wi-Fi network received through an accessible AP meets a quality threshold value required for executing the application. When the checked quality does not meet the quality threshold value required for executing the application, the processor 120 may perform a control to execute the mobile-communication-network-based application in operation 495 instead of actually connecting to the Wi-Fi network, even though connecting to the Wi-Fi network is possible. At this time, although FIG. 4C illustrates that the attribute information of the application is identified in operation 496 after the application is executed, the corresponding attribute information may be identified at a time point at which the application execution request is input by the user; however, the time point at which it is determined whether the application for which execution is requested is a predetermined application (for example, a game application) required to transmit or receive data in real time to or from the server may not be limited thereto.

Accordingly, when the application requested to be executed is such a predetermined application (for example, a game application), the processor 120 may check the Wi-Fi network quality, and when the checked quality is lower than the threshold value in operation 492, perform a control to execute the mobile-communication-network-based application. On the other hand, when the application requested to be executed is not such a predetermined application, the processor 120 does not perform operations 492 and 493, but may perform a control to execute the Wi-Fi-network-based application in operation 494.

According to an embodiment, the processor 120 may deactivate the Wi-Fi function at a time point at which it is determined that the application requested to be executed is the predetermined application (for example, the game application). According to another embodiment, after it is determined that the checked quality is lower than the threshold value and thus the mobile-communication-network-based application is executed, the processor 120 may deactivate the Wi-Fi function after the mobile-communication-network-based application is executed in order to avoid connecting to the Wi-Fi network again.

As described above, the time point at which the Wi-Fi function is deactivated in FIGS. 4B and 4C may be set simultaneously with the execution of the predetermined application through the mobile communication network or after the execution. That is, the order thereof is not limited thereto. Further, even though the Wi-Fi function is activated, while the application is executed, the time point for determining whether the application is a target application for which the Wi-Fi function should be deactivated is not limited to the operation orders of FIGS. 4B and 4C.

Figure 5:
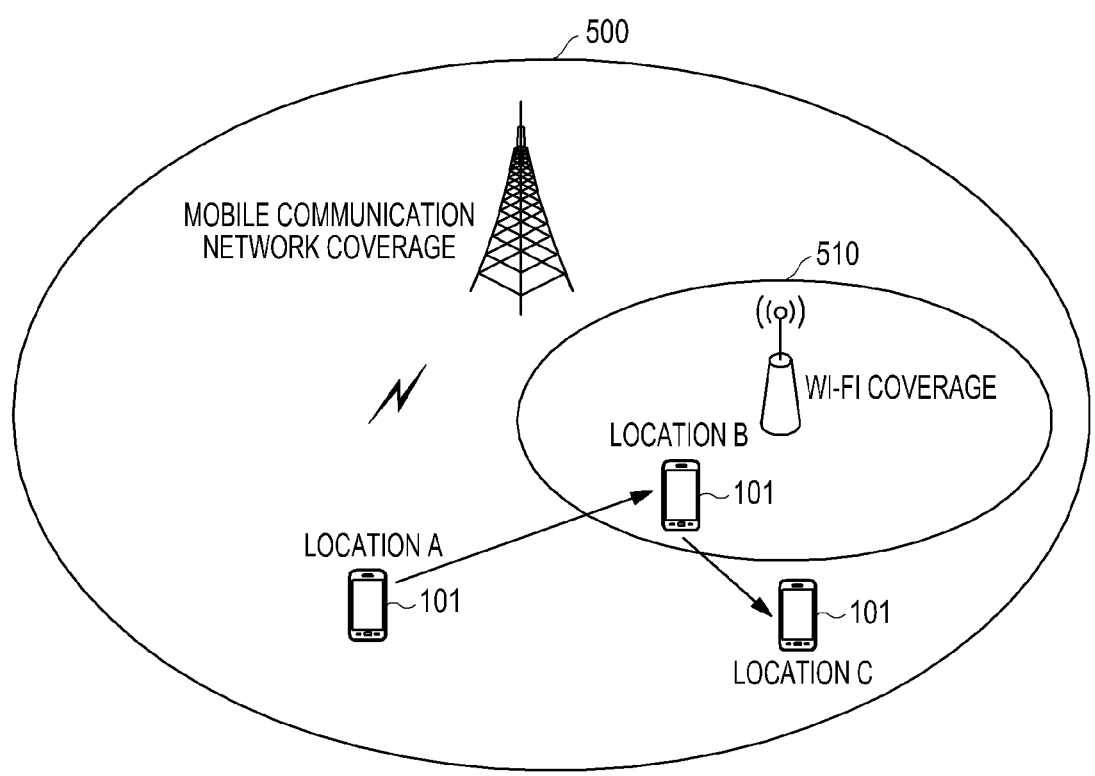
FIG. 5 illustrates an operation of limiting Wi-Fi access when an electronic device moves according to various embodiments of the present disclosure.

FIG. 5 illustrates an operation of limiting Wi-Fi access when the electronic device 101 moves according to various embodiments of the present disclosure. In FIG. 5, mobile communication network coverage indicates coverage of a cellular network, but the present disclosure may be equally applied to any cellular-based communication system such as 2G, 3G, and 4G as well as Long-Term Evolution (LTE).

Referring to FIG. 5, when the electronic device 101 in which the Wi-Fi function is turned on moves from a location A within mobile communication network coverage 500 to a location B within Wi-Fi coverage 510, the electronic device 101 may attempt to connect to the Wi-Fi connection. However, when the electronic device 101 moves from the location A to the location B while the application is executed, the electronic device 101 may not attempt to connect to the Wi-Fi connection even though there is an accessible AP according to the attributes of the executed application. For example, applications of which the Wi-Fi connection is limited may include an application for transmitting or receiving data in real time from the server, a game application, and a real-time video provision application.

Although the electronic device 101 is at location B (for example, a place in which Wi-Fi can be used, such as a home, an office, a bus, or a subway), the electronic device 101 may transmit or receive data related to the executed application to or from the corresponding server (for example, a game server) through a communication network within the mobile communication network coverage 500, such as at location A, while the application is executed. As described above, since the electronic device 101 has transmitted and received data through the mobile communication network, the electronic device 101 may not perform an operation of ending Wi-Fi access even though the electronic device 101 moves from location B to a location C within the mobile communication network coverage 500, thereby preventing the interruption of the application being executed.

Figure 6A:
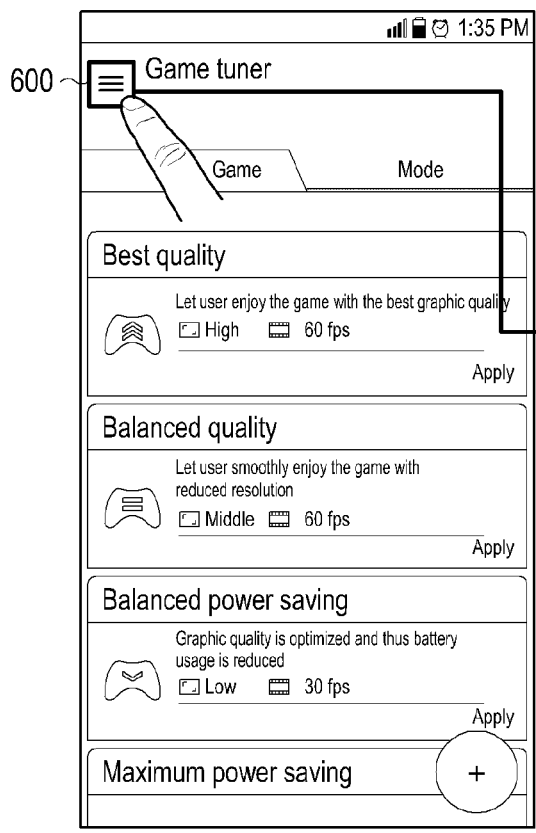
FIGS. 6A and 6B illustrate screens for limiting communication network switching for a game application according to various embodiments of the present disclosure.
Figure 6B:
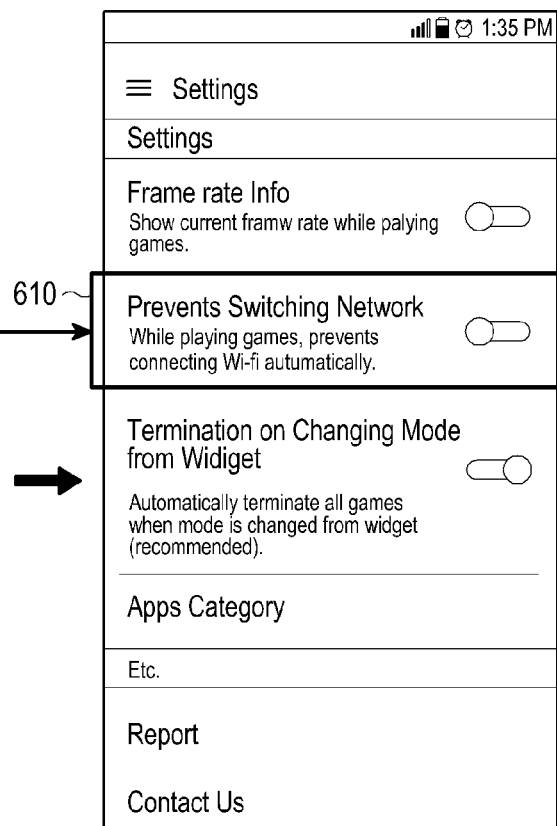

FIGS. 6A and 6B illustrate screens for limiting communication network switching for a game application according to various embodiments of the present disclosure.

FIG. 6A illustrates a screen of a game environment control application. The game environment control application is called a game tuner application, and all game applications installed in the electronic device 101 may have several steps to indicate applications for designating resolution, Frames Per Second (FPS), screen brightness, and power-saving settings.

As illustrated in FIG. 6A, when the user selects an object 600 (for example, a menu) for changing settings for the installed game application, a game setting screen may be displayed, as illustrated in FIG. 6B. By turning on or off an item 610 labeled "Prevents Switching Network" displayed on the game settings screen of FIG. 6B, whether to automatically switch communication networks for the game application may be set as indicated by reference numeral 610. The item 610 of "Prevents Switching Network" of FIG. 6B may include a graphic element for turning automatic communication network switching on or off and a detailed description thereof. For example, FIG. 6B also illustrates a detailed description indicating a function of preventing connection to Wi-Fi automatically while playing games in order to enable a user to understand the item 610 of "Prevents Switching Network".

Referring to FIG. 6B, the processor 120 may detect input of selecting the graphic element for setting on or off the item 610 of "Prevents Switching Network". The processor 120 may equally apply whether to perform automatic communication network switching for all game applications installed in the electronic device 101 in response to the input. In other words, the processor 120 may execute the game application with values applied by the game environment control application whenever the game application is executed. Accordingly, when executing the game application, the processor 120 may execute the same after uniformly applying whether to perform automatic communication network switching set regardless of the type of the game application, such as a game of Tetris or a football game. Further, the processor 120 may additionally store, as attribute information, information on whether to perform automatic communication network switching set for all game applications.

An item indicating omission in the case in which there is a lot of data to be downloaded may be additionally disposed in the item 610 indicating whether to perform automatic communication switching for the game application in the game setting screen of FIG. 6B. For example, when the user installs and then executes a large game, there may be a lot of data to be downloaded from the external server when loading the game. In this case, when there is a lot of data to be downloaded even though all game applications are set to limit the automatic Wi-Fi connection, that is, when the application is classified as an application required to download massive data on the basis of attribute information of the application, the processor 120 may exceptionally operate such that the application is set to not limit the automatic Wi-Fi connection.

Figure 7:
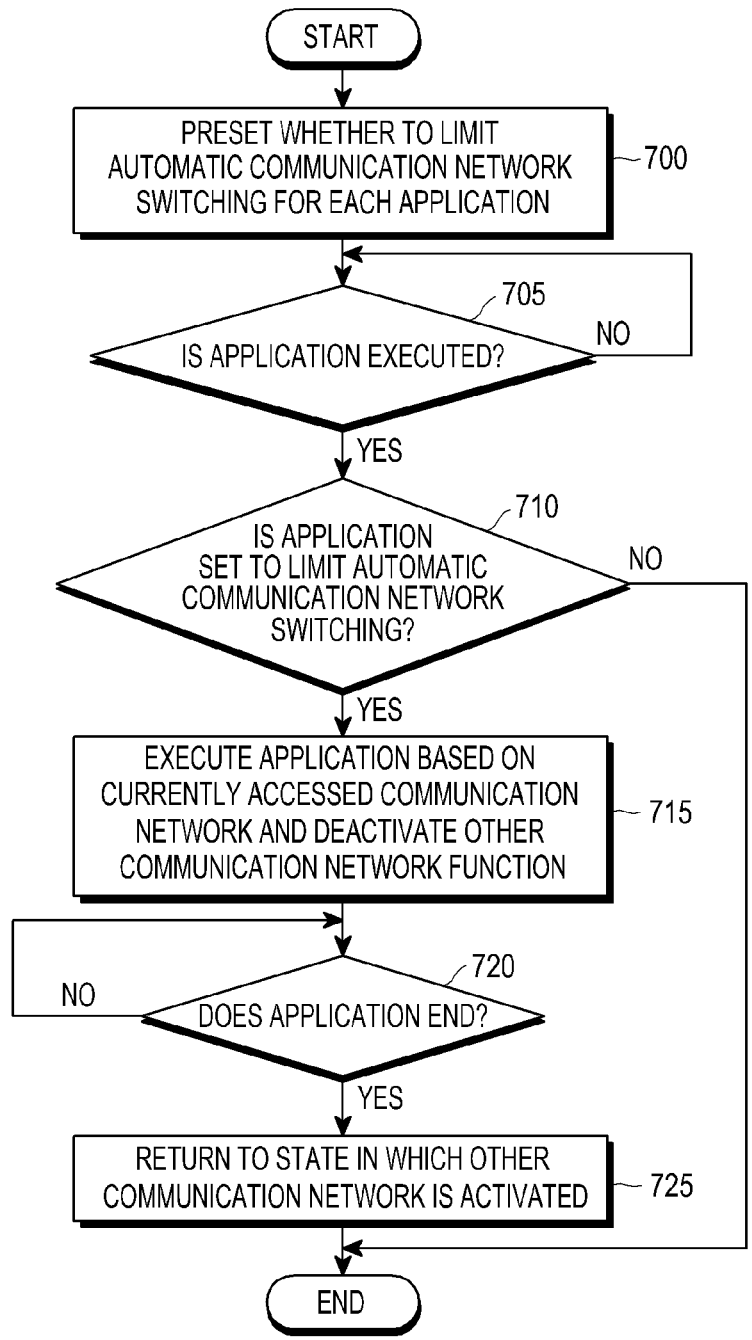
FIG. 7 is a flowchart illustrating a method of controlling a communication network connection according to respective applications by an electronic device according to various embodiments of the present disclosure.

FIG. 7 is a flowchart illustrating a method of controlling a communication network connection according to respective applications by an electronic device according to various embodiments of the present disclosure.

Referring to FIG. 7, the processor 120 may preset the limit of automatic communication network switching for each application in response to user input in operation 700. The memory 130 within the electronic device 101 stores a plurality of applications, and also stores mapping information for setting whether to limit the communication network switching for each of the plurality of applications in response to the user input. For example, with respect to a game application required to transmit and receive massive data to and from the external server, the user may not set the limit of communication network switching as necessary.

Figure 8:
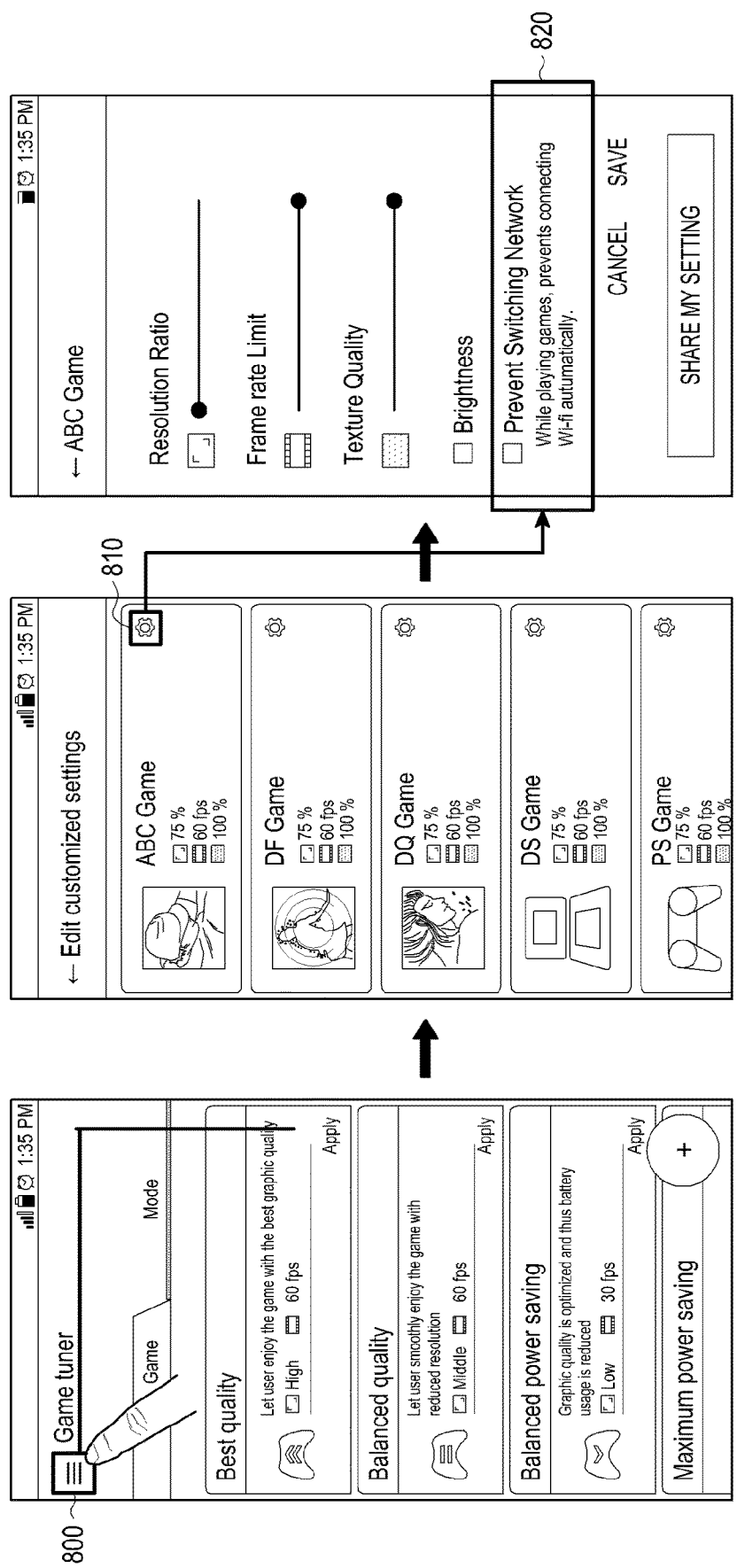
FIGS. 8A-8C illustrates screens for setting whether to limit communication network switching for respective game applications according to various embodiments of the present disclosure.

Meanwhile, a method of setting whether to limit communication network switching for each application will be described with reference to FIGS. 8A-8C. FIGS. 8A-8C illustrate screens for setting whether to limit communication network switching for respective game applications according to various embodiments of the present disclosure As illustrated in FIG. 8A, in a screen of a game environment control application, the user may select an object 800 (for example, a menu) for changing settings for the game application. In response to the user's selection, the game settings screen illustrated in FIG. 8B may be displayed.

Referring to FIG. 8B, a list indicating a plurality of game applications downloaded to the electronic device 101 may be displayed in the game settings screen. As illustrated in FIG. 8B, descriptions of the game indicated by each game application and objects for changing settings may be disposed together in each game application. When the user selects an object 810 corresponding to one game application on the list, a screen for setting whether to perform automatic communication network switching 820 for the selected game application may be displayed as illustrated in FIG. 8C. Through the settings screen, the user may set whether to limit automatic communication network switching for each application.

When there is a lot of data to be downloaded from the external server while the selected game application is loaded in FIG. 8C, an item for receiving a user's selection to temporarily release the limit of automatic communication network switching may be added. For example, when the user installs and then executes a large game, there may be a large amount of data to be downloaded from an external server when loading the game. Accordingly, a large amount of used data may be burdensome to a user who uses a limited data plan, and thus a function of temporarily releasing automatic communication network switching may be added. Therefore, when the selected game application is loaded, if the loading is completed and the actual game starts after temporarily downloading data through the Wi-Fi network, the processor 120 may perform a control to execute the game through the mobile communication network.

Meanwhile, the processor 120 may determine whether a predetermined application (for example, the game application) is executed in operation 705. When the predetermined application is executed, it is assumed that both the first communication module and the second communication module are activated. When the predetermined application is executed, the processor 120 may determine whether the application is an application set to limit automatic communication network switching on the basis of mapping information stored in the memory 130 in operation 710. When the application is not an application set to limit automatic communication network switching in operation 710, the processor 120 may execute the corresponding operation according to execution of the predetermined application, and a detailed description thereof will be omitted.

On the other hand, when the application is an application set to limit automatic communication network switching in operation 710, the processor 120 may execute the predetermined application through the currently accessed communication network and deactivate the other communication network function in operation 715. According to an embodiment, even when the application set to limit automatic communication network switching is determined to be an application having a lot of data to be downloaded upon loading on the basis of attribute information of the application, the processor 120 may first access the Wi-Fi network through the second communication module, download data from the external server, and then only when the loading is completed, deactivate the Wi-Fi network function. For example, the electronic device 101 may execute the predetermined application on the basis of the mobile communication network through the first communication module and deactivate the second communication module to block the automatic connection to the Wi-Fi network.

Meanwhile, when the user executes the predetermined application, in order to recognize whether the application set to limit automatic communication network switching is executed, the processor 120 may perform a control to display a notification on the display 160.

Figure 9:
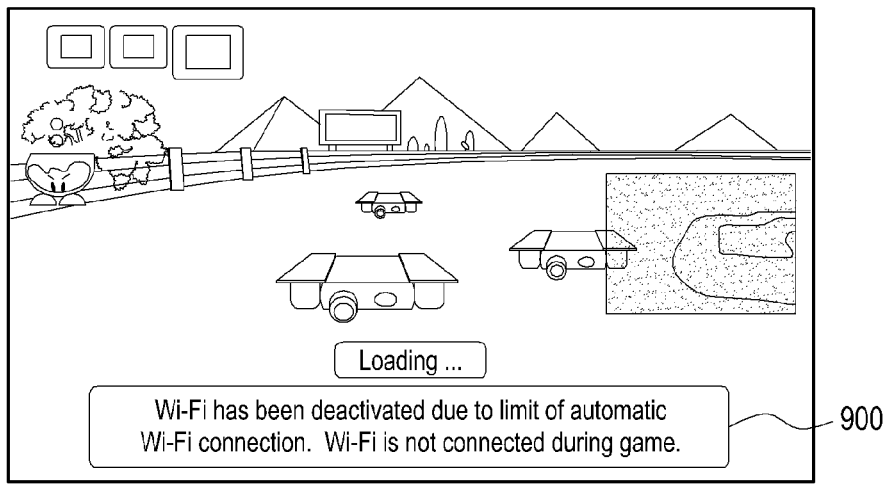
FIG. 9 illustrates a screen when a game application is executed according to various embodiments of the present disclosure.

FIG. 9 illustrates a screen that is shown when a car game application is executed according to various embodiments of the present disclosure. Referring to FIG. 9, when executing the car game application, the processor 120 may perform a control to display a notification indicating the deactivation of Wi-Fi due to the limit of the automatic Wi-Fi connection and a notification indicating the disconnection of Wi-Fi during the game on the loading screen while exchanging data with the external server.

Subsequently, in operation 720, the processor 120 may determine whether the predetermined application ends, and may execute the predetermined application while the state in which the application accesses the mobile communication network is maintained without ending.

When an application end request is input by the user in operation 720, the processor 120 may terminate the execution of the application and may also return to the active state of the other communication network function, which was deactivated during the execution of the predetermined application, in operation 725. Accordingly, the processor 120 may perform a control to display a notification indicating that the Wi-Fi function that was deactivated returns to the active state on the display 160.

Figure 10:
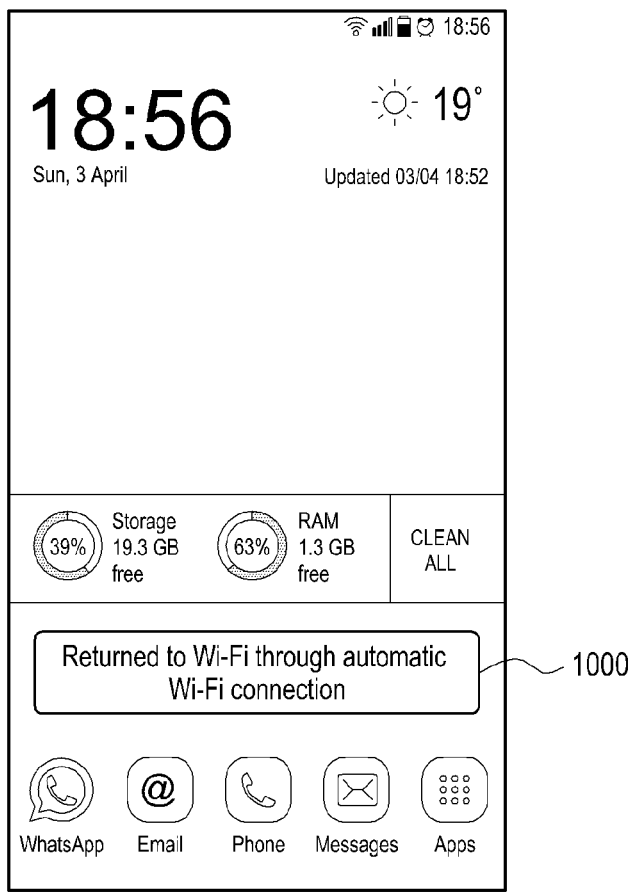
FIG. 10 illustrates a return screen after the game application ends according to various embodiments of the present disclosure.

FIG. 10 illustrates a return screen after the game application ends according to various embodiments of the present disclosure.

FIG. 10 illustrates a screen in the case in which the Wi-Fi function is activated again and access to the Wi-Fi network is performed at the same time. For example, the processor 120 may perform a control to display a notification indicating that the screen returns to a previous screen or a home screen when the application ends. Further, when the application ends in the state in which the electronic device 101 is located in a place where Wi-Fi access is possible, the Wi-Fi function is activated simultaneously with the end of the application, so that the processor 120 may be made aware that Wi-Fi access is possible. Accordingly, when accessing the Wi-Fi network, the processor 120 may perform a control to display an indicator indicating Wi-Fi in an indicator area and a notification 1000 indicating the return to Wi-Fi due to the automatic Wi-Fi connection at the same time on the display 160.

The term "module" as used herein may include a unit consisting of hardware, software, or firmware, and may, for example, be used interchangeably with the term "logic", "logical block", "component", "circuit", or the like. The "module" may be an integrated component, or a minimum unit for performing one or more functions or a part thereof. The "module" may be mechanically or electronically implemented and may include, for example, an Application-Specific Integrated Circuit (ASIC) chip, a Field-Programmable Gate Arrays (FPGA), or a programmable-logic device, which has been known or are to be developed in the future, for performing certain operations. At least some of devices (e.g., modules or functions thereof) or methods (e.g., operations) according to various embodiments may be implemented by an instruction which is stored a computer-readable storage medium (e.g., the memory 130) in the form of a program module. The instruction, when executed by a processor (e.g., the processor 120), may cause the one or more processors to execute the function corresponding to the instruction. The computer-readable storage medium may include a hard disk, a floppy disk, a magnetic medium (e.g., a magnetic tape), an Optical Media (e.g., CD-ROM, DVD), a Magneto-Optical Media (e.g., a floptical disk), an inner memory, etc. The instruction may include a code made by a complier or a code that can be executed by an interpreter.

The programming module according to the present disclosure may include one or more of the aforementioned components or may further include other additional components, or some of the aforementioned components may be omitted. Operations performed by a module, a programming module, or other elements according to various embodiments may be executed sequentially, in parallel, repeatedly, or in a heuristic manner. At least some operations may be executed according to another sequence, may be omitted, or may further include other operations.

The term "module" as used herein may include a unit consisting of hardware, software, or firmware, and may, for example, be used interchangeably with the term "logic", "logical block", "component", "circuit", or the like. The "module" may be an integrated component, or a minimum unit for performing one or more functions or a part thereof. The "module" may be mechanically or electronically implemented and may include, for example, an Application-Specific Integrated Circuit (ASIC) chip, a Field-Programmable Gate Arrays (FPGA), or a programmable-logic device, which has been known or are to be developed in the future, for performing certain operations.

At least some of devices (e.g., modules or functions thereof) or methods (e.g., operations) according to various embodiments may be implemented by an instruction which is stored a computer-readable storage medium (e.g., the memory 130) in the form of a program module. The instruction, when executed by a processor (e.g., the processor 120), may cause the one or more processors to execute the function corresponding to the instruction. The computer-readable storage medium may include a hard disk, a floppy disk, a magnetic medium (e.g., a magnetic tape), an Optical Media (e.g., CD-ROM, DVD), a Magneto-Optical Media (e.g., a floptical disk), an inner memory, etc. The instruction may include a code made by a complier or a code that can be executed by an interpreter.

The programming module according to the present disclosure may include one or more of the aforementioned components or may further include other additional components, or some of the aforementioned components may be omitted. Operations performed by a module, a programming module, or other elements according to various embodiments may be executed sequentially, in parallel, repeatedly, or in a heuristic manner. At least some operations may be executed according to another sequence, may be omitted, or may further include other operations.

According to various embodiments, a storage medium storing instructions is provided. The instructions may be configured to cause at least one processor to, when executed by the at least one processor, perform at least one operation. The at least one operation includes an operation of executing a predetermined application using a first communication module in a state in which both the first communication module for performing communication through a first communication network and a second communication module having a higher priority than the first communication module are activated; and an operation of performing control to deactivate the second communication module while the predetermined application is executed.

Various embodiments disclosed herein are provided merely to easily describe technical details of the present disclosure and to help the understanding of the present disclosure, and are not intended to limit the scope of the present disclosure. Accordingly, the scope of the present disclosure should be construed as including all modifications or various other embodiments based on the technical idea of the present disclosure.

The invention claimed is:

1. An electronic device comprising:
   a display;
   a first communication circuit configured to perform communication through a first communication network;
   a second communication circuit configured to perform communication through a second communication network;
   a memory; and
   a processor electrically connected to the memory,
   wherein the memory stores instructions causing the processor to, when executed, receive a preference for preventing communication network switching on a predetermined application, and deactivate the second communication circuit while the predetermined application with the preference for preventing communication network switching is executed using the first communication circuit, in a state in which both the first communication circuit and the second communication circuit, having a higher priority than the first communication circuit, are activated, and wherein, when the predetermined application is executed using the first communication circuit, the processor performs control to display information indicating a limit of a second communication network connection through the second communication circuit on the display and, when the execution of the predetermined application ends, performs control to display information indicating release of the limit of the second communication network connection on the display.

2. The electronic device of claim 1, wherein the first communication network is a mobile communication network which is one of 2nd Generation (G), 3G, 4G, and Long-Term Evolution (LTE), and the second communication network is a Wi-Fi network.

3. The electronic device of claim 1, wherein, when the execution of the predetermined application ends, the processor performs control to activate the second communication circuit.

4. The electronic device of claim 1, wherein the predetermined application is an application required to transmit or receive data in real time to or from an external server, and comprises at least one of a real-time video provision application and a game application.

5. The electronic device of claim 1, wherein, when the predetermined application is executed using the first communication circuit, the processor performs control to deactivate the second communication circuit according to attribute information of the predetermined application.

6. The electronic device of claim 5, wherein the attribute information of the predetermined application comprises at least one of application identification information, an application type, and information on an amount of used data.

7. The electronic device of claim 1, wherein the memory stores a plurality of applications and the processor stores, in the memory, mapping information for setting whether to limit communication network switching for each of the plurality of applications in response to a user input.

8. The electronic device of claim 7, wherein the processor determines whether the predetermined application is an application set to limit the communication network switching, based on the mapping information stored in the memory, and when the predetermined application corresponds to the application set to limit the communication network switching, performs control to deactivate the second communication circuit while the predetermined application is executed using the first communication circuit.

9. A method of controlling a communication network connection by an electronic device, the method comprising:

receiving a preference for preventing communication network switching on a predetermined application;

executing the predetermined application with the preference for preventing communication network switching using a first communication circuit in a state in which both the first communication circuit for performing communication through a first communication network and a second communication circuit having a higher priority than the first communication circuit are activated;

performing control to deactivate the second communication circuit while the predetermined application is executed;

in response to the predetermined application being executed using the first communication circuit, displaying information indicating a limit of a second communication network connection through the second communication circuit on a display of the electronic device; and in response to termination of the execution of the predetermined application, displaying information indicating release of the limit of the second communication network connection on the display.

10. The method of claim 9, wherein the first communication network is a mobile communication network which is one of 2nd Generation (G), 3G, 4G, and Long-Term Evolution (LTE), and the second communication network is a Wi-Fi network.

11. The method of claim 9, further comprising, when the execution of the predetermined application ends, performing control to activate the second communication circuit.

12. The method of claim 9, wherein the predetermined application is an application required to transmit or receive data in real time to or from an external server, and comprises at least one of a real-time video provision application and a game application.

13. The method of claim 9, further comprising, when the predetermined application is executed using the first communication circuit:

determining attribute information of the predetermined application; and performing control to deactivate the second communication circuit according to the attribute information of the predetermined application.

14. The method of claim 13, wherein the attribute information of the predetermined application comprises at least one of application identification information, an application type, and information on an amount of used data.

* * * * *